July 10, 1928.

I. I. EREMEEFF

BAROMETRIC DEVICE

Filed July 23, 1921      2 Sheets-Sheet 1

1,676,983

Inventor
Ivan I. Eremeeff

July 10, 1928.

I. I. EREMEEFF

BAROMETRIC DEVICE

Filed July 23, 1921

Inventor
Ivan I. Eremeeff

Patented July 10, 1928.

1,676,983

UNITED STATES PATENT OFFICE.

IVAN I. EREMEEFF, OF DAYTON, OHIO.

BAROMETRIC DEVICE.

Application filed July 23, 1921. Serial No. 487,143.

This invention relates generally to a barometric device and more particularly to an instrument of this type which is intended to indicate small differences of altitude on a magnified scale.

The particular embodiment of the invention described herein is provided with a sensitive mechanism responsive to slight changes in atmospheric pressure and with multiplying devices for indicating the extent of movement of the mechanism.

This invention also aims to provide means for temporarily connecting the mechanism responsive to changes in pressure to the atmosphere so that any desired elevation may be selected as a datum.

Other objects of the invention, consisting of novel features of construction and arrangements of parts, will become apparent on reference to the subjoined specification which describes the invention in connection with the accompanying drawings.

Figure 3:
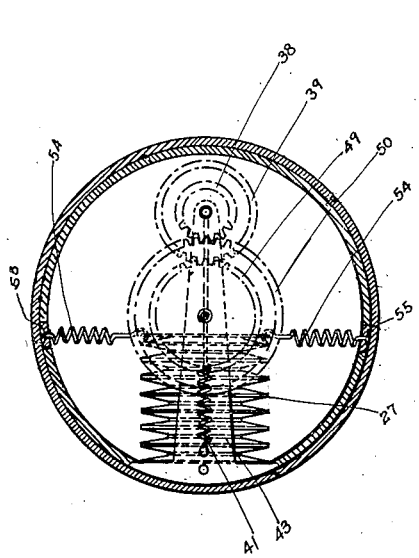
Figure 3 is a front elevation of the instrument case with the front plate removed;

The numeral 10 designates generically a thermally insulated casing having the outer shell 11 and the inner shell 12 spaced therefrom and adapted to contain fluid under constant pressure for a given datum. The space between these shells is preferably filled with a substance 13 which is a poor conductor of heat, such as felt. This casing is provided at the top with an opening which pierces both of the shells, and a tube 14 is inserted in this opening and is provided with a flange 15 which is adapted to abut against the outer shell 11 in air tight relation thereto.

An instrument case 16 is mounted in a suitable annular bracket 17 which is secured to the dash or instrument board 18 of an aircraft or motor vehicle by means of screws 19. This bracket is formed with a depending annular flange 20 and the instrument case 16 is inserted through the rear end of the bracket and maintained in place by means of the screws 21 which pass through suitable apertures formed in the flange 20 and engage screw threaded apertures formed in the front face of the instrument case. The base 22 of the instrument case is made somewhat thicker than the other walls thereof and is provided with an outstanding nipple 23, an air chamber 24 and an air duct 25 which passes through the nipple. The passage 25 and the chamber 24 communicate at their inner ends with a central opening or conduit 26 which is adapted to communicate with the interior of a suitable pressure responsive device herein illustrated in the form of a bellows 27. The bellows is located within the instrument case 16 and is attached at its lower end to the base 22 concentrically about the conduit 26. The air chamber 24 communicates near its outer end with a conical passage 28 controlled by a slidable, conical valve 29. The valve 29 is formed with an outwardly extending stem 30 which passes through an aperture in the flange 20. The outer end of this valve stem is equipped with a knob or handle 31 whereby the valve may be conveniently operated against the tension of a coil spring 32 which is compressed between the flange 20 and the conical plug of the valve 29 and thus normally tends to retain the valve upon its seat.

Opposite walls of the instrument case 16 are provided with plugs 33, 34, one or both of which may be detachably mounted therein. These plugs are formed with central apertures which are adapted to receive the reduced outer ends of a shaft 35 so that the latter is rotatably mounted in bearings thus formed in the plugs 33, 34. A flexible connection such as a chain 36 is secured at one end to the shaft 35 and at the other end to a loop 37 secured to the cover plate of the bellows.

Near one end of the shaft 35 a gear set, composed of a small gear 38 and a large gear 39, is secured. A flexible connection such as a chain 40 is wound upon the shaft 35 in a direction opposite from chain 36, and the lower end of this chain 40 is connected to one end of a spring 41, the other end of which is fastened to a hook 42 projecting outwardly from a partition wall 43. This partition wall divides the instrument case into two communicating compartments, one containing the pressure responsive device and the other containing the transmitting gearing, some of which is above described. An aperture 44 is formed in the front wall of the instrument case and telescoping shafts consisting of the inner shaft 45 and the outer shaft 46 are rotatably mounted in this aperture. The shaft 45 carries the long indicating hand 47, and the shaft 46 carries the short indicating hand 48. In order that the hands 47 and 48 may have the correct relative motion, the shafts 45 and 46 carry, respectively, the gears 49 and 50, which mesh with the larger gear 39 and the smaller gear 38. The front plate is provided with a suitable dial 51 and a cover glass 52 is placed over the indicating hands and the dial and is retained in place by the depending flange 20 of the supporting bracket 17. The gearing is preferably arranged so that the large hand will make four revolutions to one revolution of the small hand.

The instrument case 16 is provided with a suitable vent 53 so that the pressure within the case will at all times be equal to the prevailing atmospheric pressure. In order to restore the indicating means to zero position and to damp oscillations of the same, springs 54 are arranged at opposite sides of the bellows and are connected at one end to the loop 37 and at the other end to suitable plugs 55 inserted in the walls of the casing.

A rubber tube or the like 14' connects the tube 14 of the casing 10 to the nipple 23 of the instrument case and thus communicates the pressure prevailing within the casing 10 to the bellows 27.

When it is desired to use a certain elevation as a datum, the valve 29 is opened so that the pressure within the bellows and casing 10 becomes equalized with the atmospheric pressure. This is the zero indication of the mechanism. The valve 29 is then permitted to close and as the device ascends, the bellows 27 will expand owing to the decreased pressure in the instrument case. The shaft 35 is then caused to turn by the spring 41 and the gearing is operated for moving the hands 47 and 48 in the proper ratio. After the bellows have been expanded to the limit of their design, or after the long hand has made four revolutions, the valve 29 may again be opened and further elevations obtained with reference to this new datum. In the case of descent, the bellows 27 will contract and exert a tension stress upon chain 36 whereby the shaft 35 is turned in opposition to spring 41.

Figure 5:
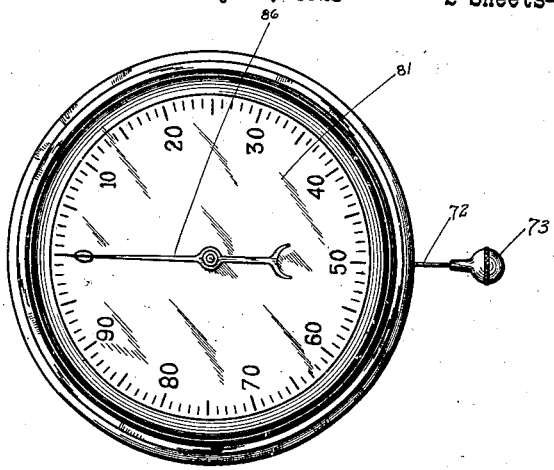
Figure 5 is a plan view of this modified form showing the indicating dial.
Like numerals of reference indicate corresponding parts throughout the several views of the drawings.
Figure 4:
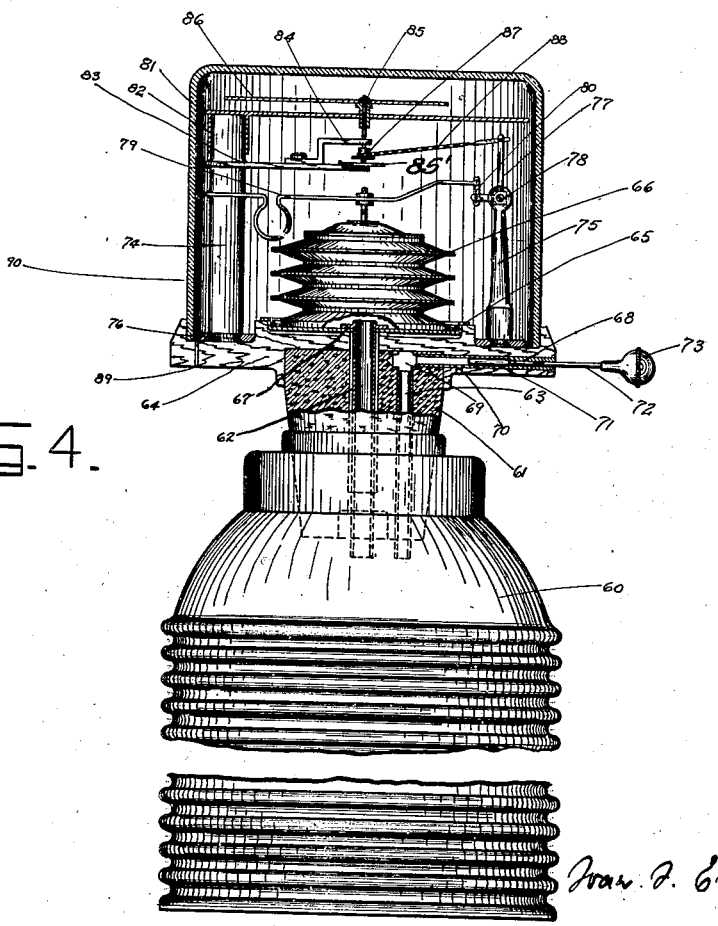
Figure 4 is a side elevation with certain parts shown in vertical section, of a modified form of my invention.

In Figures 4 and 5, a slightly modified form of the invention is shown in which an ordinary thermos bottle 60 is provided with a stopper 61 formed with two parallel passages 62 and 63 in which suitable tubes have been inserted. The stopper 61 is mounted in a recess formed in the bottom of a supporting plate or strip 64 and the top surface of this strip is formed with an annular depression in which is mounted the base plate 65 of a bellows 66. The tube inserted in the passage 62 pierces the base plate 65 and thus communicates with the interior of the bellows. This tube is preferably formed with annular flange 67 which abuts against the base plate 65 in air tight relation.

The stopper 61 is also formed with a transverse opening which is adapted to align with a corresponding opening formed in the supporting plate 64 and these openings are adapted to receive a tube 68 which is connected to the tube contained in the passage 63 by a suitable air tight connection 69. An aperture 70 pierces the plate 64 and the tube 68 in spaced relation to the connection 69, and a valve 71 is slidably mounted in the tube 68 to control the communication between the vent 70 and the interior of the thermos bottle 60. In order to limit the motion of the valve 71 a suitable shoulder is formed in the tube 68 by reducing the diameter of its bore and a valve stem 72 extends through this reduced bore and is connected at its outer end with a knob 73 for convenience of operation. Posts 74 and 75 are secured to a ring 76 which is mounted on the plate 64. These posts extend upwardly on opposite sides of the bellows 66 and a bell crank lever 77 is pivoted to the upper end of the post 75 by a stub shaft 78. A spring 79 is connected at one end to the post 74, at the other end to a link 80, and intermediately it is connected to the cover plate of the bellows. The link 80 is pivoted at one end to one arm of the bell crank lever 77. A dial plate 81 has a sleeve extension 82, by means of which it is mounted upon the upper end of the post 74. A plate 83 is secured to the post 74 in spaced relation to the dial plate and a bent plate 84 is secured to the plate 83 and has an arm projecting in spaced relation thereto. A shaft 85 extends through an opening in the dial plate and an aligning aperture in the arm of plate 84 and abuts at its lower end against the plate 83. The shaft 85 is rotatably mounted in the bearings thus provided and is equipped at its upper end with an indicating hand 86. A coil spring 85' is connected at one end to the shaft and at the other end to the plate 83. Shaft 85 has attached thereto a small sprocket wheel or pulley 87 and a chain 88 is secured at one end to the pulley and at the other end to the long arm of the bell crank lever 77. A vent 89 is provided in the supporting strip 64 in order to maintain atmospheric pressure within the casing 90 which contains the bellows 66. The casing 90 is preferably made of transparent material so that the readings indicated by the hand 86 may be readily visible.

Figure 2:
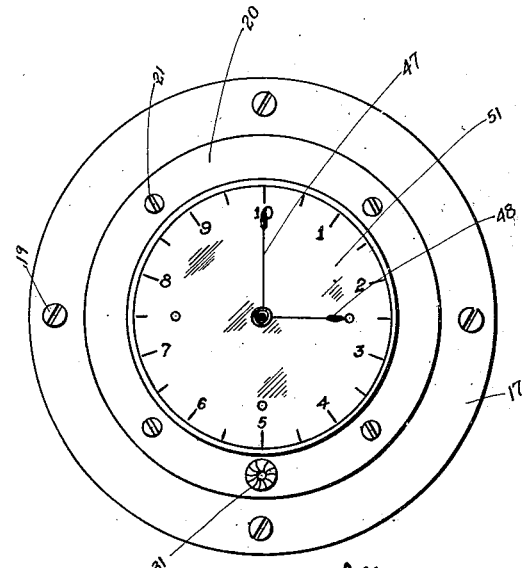
Figure 2 is a front elevation of the indicating means.
Figure 1:
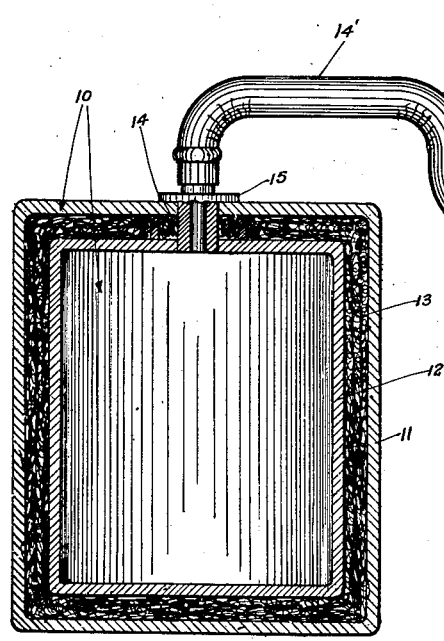
Figure 1 is a central vertical section through the barometric device.
Figure 1:
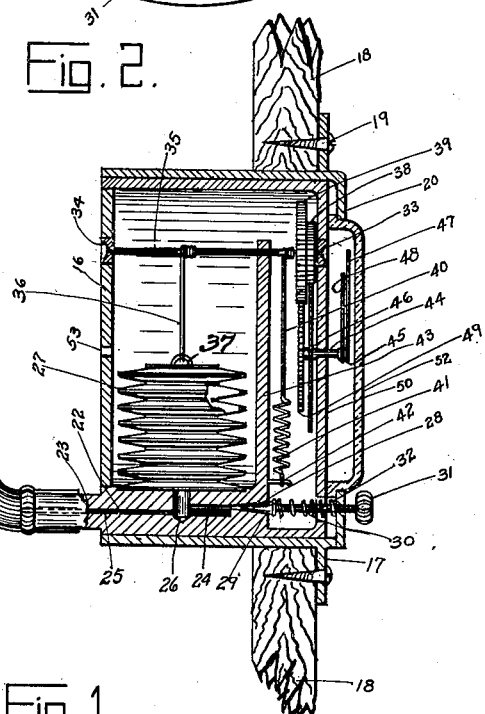

This form of my invention operates similarly to the form illustrated in Figures 1, 2 and 3. The valve 71 is first opened in order to obtain the prevailing atmospheric pressure within the thermos bottle and bellows. This valve is then closed so as to shut off communication between the atmosphere and the interior of the thermos bottle and bellows. As the aircraft or motor vehicle ascends, the bellows will expand and act upon the spring so as to actuate bell crank 77 which through the medium of chain 88 actuates shaft 85 and the indicating hand 86.

The apparatus of this invention is intended primarily to indicate relatively small differences in elevation such as 4,000 feet but it will be understood that it may also be applied to greater differences in altitude, depending, of course, upon the design of the pressure responsive means and the ratio existing between the movement of the pressure responsive means and the indicating device. The apparatus may also be used as a simple barometer to indicate weather conditions. When mounted on a motor vehicle the device may be used in connection with a chart or other recording mechanism to indicate the topography of the land traversed by the vehicle.

It is evident that those skilled in the art to which this invention appertains may vary the details of construction, as well as the arrangement of parts, without departing from the spirit of the invention, and therefore I do not wish to be limited to the above disclosure except as may be required by the appended claims.

I claim:

1. An instrument of the class described, comprising in combination a casing, an instrument case having a vent communicating with the atmosphere, pressure responsive bellows within said instrument case, said bellows being attached to said instrument case on one end, the other end whereof is movable in response to variations in the support afforded thereto by the internal pressure of said bellows against atmospheric pressure, means forming a communicative passage between the interior of said casing and the interior of said bellows, mechanism in the instrument case for indicating the extent of movement of said bellows and a normally closed valve adapted to be opened to afford communication between the atmosphere and said means and the interior of said bellows.

2. An instrument of the class described comprising the combination with an instrument case having a vent communicating with the atmosphere, pressure responsive bellows within said instrument case, said bellows being attached to said instrument case on one end, the other end whereof is movable in response to variations in the support afforded thereto by the internal pressure of said bellows against atmospheric pressure, a shaft rotatably mounted in said case, a connection between said bellows and shaft for rotating said shaft in one direction, spring devices tending to return the shaft to normal position, an indicating device, and transmitting mechanism between said shaft and said indicating device, of a casing, means forming a communicative passage between the interior of said casing adapted to contain fluid under pressure and the other end of said bellows and valve means between said passage and the atmosphere.

3. An instrument of the class described comprising the combination with an instrument case having a vent communicating with the atmosphere, pressure responsive bellows within said case, a rotatable shaft within said instrument case, an indicating device therefor, a connection between said bellows and shaft for rotating said shaft in one direction, spring actuated means tending to rotate said shaft in the other direction for transmitting relative motion of said pressure responsive bellows to said indicating device, of a casing, a member having a passage therethru and connecting the interior of said casing with interior of said pressure responsive bellows, and valve means for opening and closing communication between the atmosphere and the interior of said pressure responsive bellows and said casing respectively.

4. In an instrument of the class described comprising in combination, an instrument case, a pressure responsive bellows therein, a thermally insulated casing, a member provided with a passage and connecting the interior of said casing and the interior of said bellows, devices for connecting the interior of said pressure responsive bellows and said casing to the atmosphere at desired intervals, a rotatable shaft, a connection between said shaft and said bellows for rotating said shaft in one direction or the other depending upon the expansion or contraction of said bellows, spring devices extending laterally from said bellows for returning the latter to normal position, an indicating device and transmitting mechanism in the instrument case and between said shaft and indicating device.

In testimony whereof I have affixed my signature.

IVAN I. EREMEEFF.